March 11, 1947. T. P. CAMPBELL 2,417,101
TITANIFEROUS MAGNETITE TREATMENT
Filed Dec. 19, 1942 2 Sheets—Sheet 2
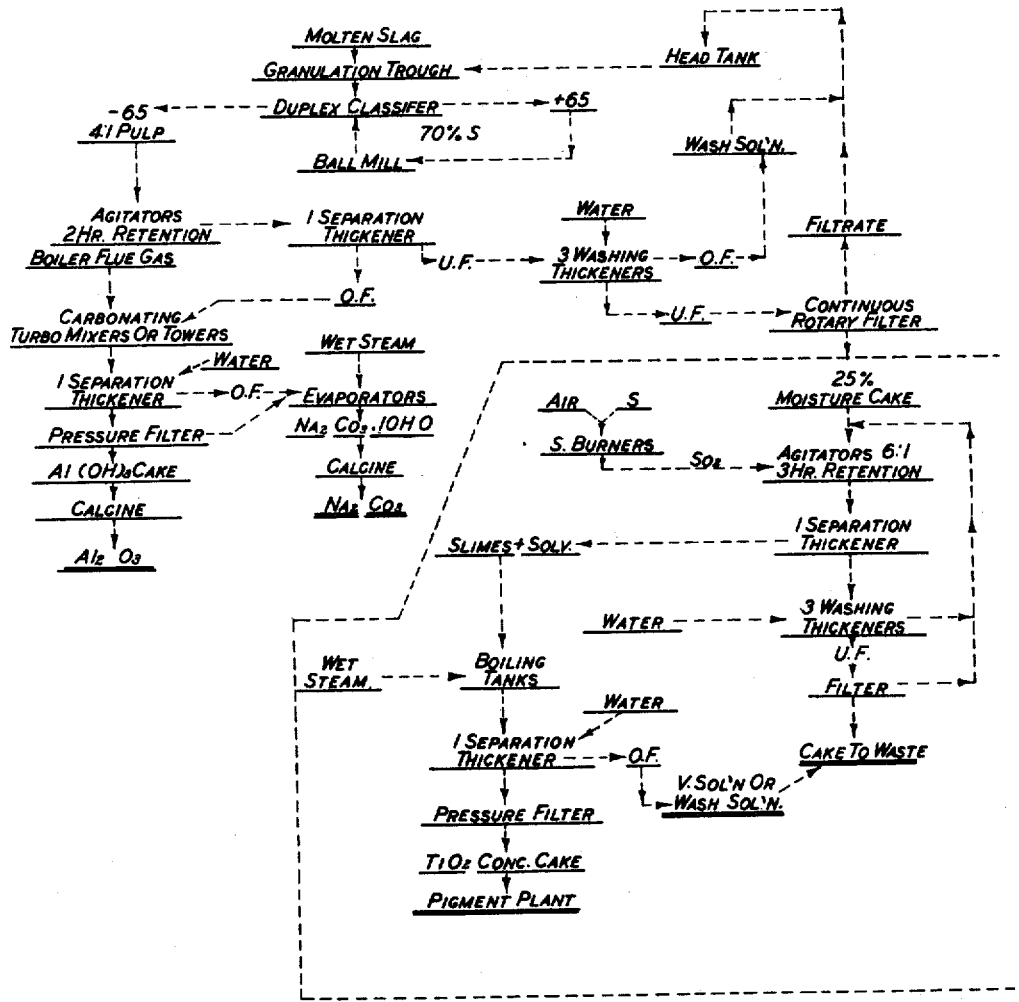
Fig.-2-
THOMAS P. CAMPBELL
INVENTOR.
BY
ATTORNEY.

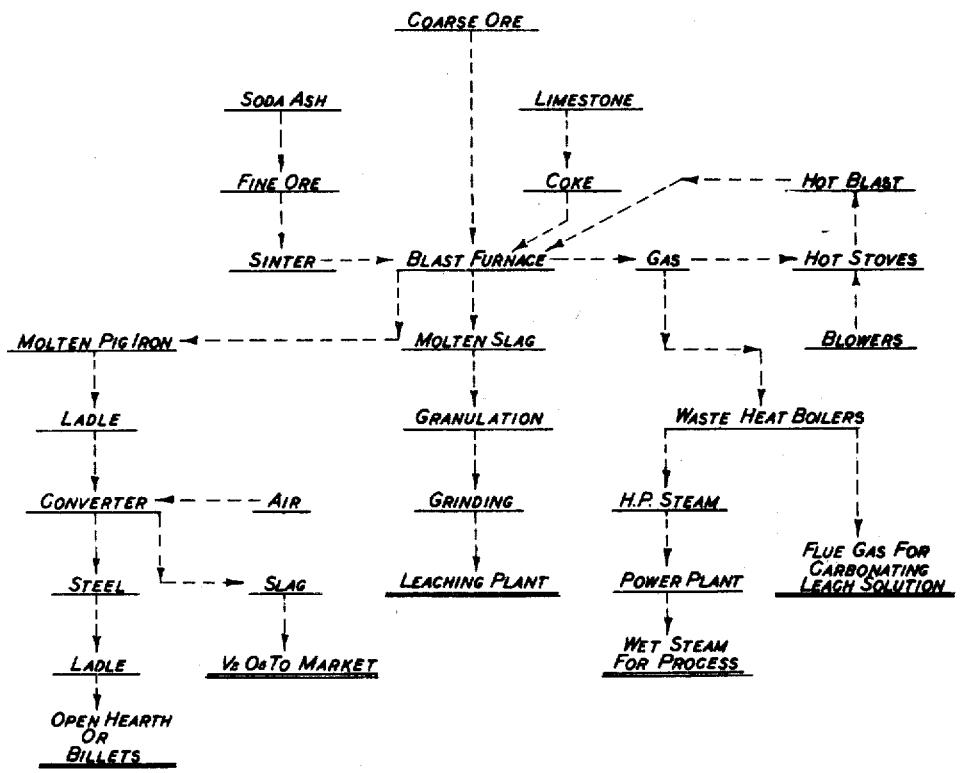
Fig.-1-

Patented Mar. 11, 1947

2,417,101

UNITED STATES PATENT OFFICE 2,417,101

TITANIFEROUS MAGNETITE TREATMENT

Thomas P. Campbell, Denver, Colo.

Application December 19, 1942, Serial No. 469,559

27 Claims. (Cl. 75—30)

This invention relates to the smelting of titaniferous iron ores and more particularly relates to a treatment method for the recovery of the vanadium content of such ores.

Titaniferous iron ores carrying more than two to three per cent of titanium are designated "titaniferous magnetites" and the Iron Mountain, Wyoming, and Lake Sanford, New York deposits are typical examples. While the present invention will be described with reference to the treatment of such ores and products derived therefrom, it will be understood that the present invention is designed to treat similar compositions, regardless of the source of their formation.

In investigating these ores it has been discovered that while some of the titanium is present in the ore in the form of ilmenite, much of this mineral is very intimately associated with the magnetite and part of the titanium may be finely dispersed in the magnetite grains as rutile or some like crystalline form of $TiO_2$. Because of this condition, fine-grinding does not produce a clean, quantitative unlocking of the constituent minerals, for which reason the recovery of the several constituents requires the application of chemical rather than physical methods. It is also well known that all such ores carry appreciable quantities of vanadium.

Such ores have not been considered a suitable product for blast furnace operations as the industry has prescribed a one per cent limit for the titanium content of the iron ores taken for treatment. Under the recent war demand for metals however, the need for increased vanadium output has provided additional commercial possibilities for these ores.

It is an object of the present invention to provide a simple, economical and efficient smelting treatment for titaniferous iron ores in which the vanadium content may be recovered in the molten ferrous metal while the titanium content is recovered in the slag.

Another object of the invention is to form a slag in the smelting of titaniferous iron ores which is amenable to acid leaching treatments for the recovery of constituent products of the slag.

A further object of the invention is to provide a simple and efficient method of converting the iron content of titaniferous iron ores into a suitable product for use as a "scrap substitute" in the open hearth process.

Still another object of the invention is to provide a simple, economical and efficient treatment for the recovery of the vanadium content of titaniferous iron ores.

A still further object of the invention is to provide simplified and highly efficient acid leaching treatments for compositions of the character of slags formed in the smelting of titaniferous iron ores.

Other objects reside in novel steps and treatments, the details of which will be set forth fully in the course of the following description.

To afford a better understanding of the practice of the present invention, reference will be made to the accompanying flow sheets illustrating a typical treatment. In the accompanying drawings, Figure 1 is a flow sheet of a typical smelting operation according to the present invention, and Figure 2 is a flow sheet of a typical acid leaching operation according to the present invention.

In performing the smelting operation, a substantial quantity of soda together with lime rock is taken as fluxing agent of the treatment. Usually heating continues until a temperature in excess of 1350° C. has been reached. At the high temperatures prevailing quantities of hot soda gases are thrown out which have a tendency to attack most furnace linings.

To offset this condition, a water jacketed furnace is recommended. But when lining materials possessing suitable soda-resistant properties are available, conventional smelting furnaces may be employed. In this connection any suitable procedure, whatever its manner of treatment, which attains the same end may be employed within the spirit and scope of the invention.

For convenience in description, the operations shown in Figure 1 will be described with reference to the treatment of titaniferous iron ore from the Iron Mountain, Wyoming deposit. The content of the ore varies considerably in different samples, but on the average these ores will contain: iron, 49.1%; $TiO_2$, 21.1%; $Al_2O_3$, 4.9%; MgO, 1.9%; $SiO_2$, 1.1%; $V_2O_5$, 0.6% and fractional quantities of such other constituents as lime, phosphorus, sulfur, $Cr_2O_3$ and $MnO_2$.

In preferred practice this ore is crushed until about 50% will pass 10 mesh. The fines of this operation are separated, mixed with soda ash and sintered. The fines include all —10 mesh material and the ore can be sintered with as little as 10% of its weight of dry soda ash at 1000° C.

The sinter thus produced is an ideal constituent of the blast furnace charge because of its physical characteristics. Absence of moisture reduces fuel requirements; and as it consists of large porous chunks that are reduced readily, this sinter speeds up furnace operation and greatly increases furnace capacity in terms of pig iron.

In a certain treatment, the unit charge consisted of 100 lbs. Wyoming ore, 25 lbs. petroleum coke, 22 lbs. of lime rock and 22 lbs. of soda ash. This charge was heated in the furnace until a temperature of 1450° C. was attained and the temperature then was held at approximately 1450° C. until the charge was completely molten, fluid and quiet. It was then poured, and after cooling the iron and slag were separated, as indicated in Figure 1.

In numerous tests it has been found that the slag and metal products so separated have substantially equal weights. In a smelting operation in which temperatures of 1450° C. or over are attained, the vanadium goes into the iron, affording a simplified recovery in a secondary treatment.

However, if the smelting temperature is held below 1400° C. for example, the reduction of the iron is satisfactory, and the vanadium content instead of collecting in the metal, is deposited in the slag. Thus, by selective control of flux and temperature, the vanadium content can be recovered with the metal, or with the slag, as preferred.

In the flow sheet, Figure 1, the molten pig iron is fed by a ladle into a Bessemer converter and subjected to an air blast which oxidizes the vanadium, throwing it into the converter slag as $V_2O_5$. As this is essentially an oxidizing action, it will be understood that any similar treatment producing the desired degree of oxidizing action may be employed at this stage. The pig iron at this stage contains very low limits of other impurities for which reason the slag formed in this operation is high grade as to its vanadium content, and constitutes a marketable product on cooling.

In the converter operation, it may be necessary to add ferro-silicon and ferro-manganese, due to the previous elimination of the silicon content of the ore from the molten ferrous product. As a result, the converter slag will contain fusible silicates of manganese and iron together with small amounts of lime and alumina from the converter lining, and as much as a 25% equivalent of $V_2O_5$.

The iron recovered in the blast furnace operation is high grade, white and extremely hard; it would serve well for such products as car wheels, anvils, grinding balls, mill liners and other types of wear-resisting materials. The blown metal is well suited to preparation of high grade alloy steels, tool steels and the like, or for use as a scrap replacement in the open-hearth furnace (duplex type).

Consequently, in Figure 1, the final product of the iron conversion has been designated in the alternative as "billets" or "open hearth."

The operations so far described are related to the subject matter of my co-pending application Serial No. 419,295, filed November 15, 1941, for Treatment of titaniferous ores and features described but not claimed herein have been made the subject of claims in said application.

The molten slag from the smelting operation hereinbefore described, was analyzed and found to contain:

| | Per cent | | Per cent |
|---|---|---|---|
| $TiO_2$ | 37.1 | $V_2O_5$ | 0.3 |
| MgO | 3.3 | FeO | 4.6 |
| $Al_2O_3$ | 8.6 | CaO | 21.6 |
| $SiO_2$ | 1.9 | $Na_2O$ | 22.6 |

Due to the use of soda ash as a fluxing agent, compounds of lime or magnesia with titanium and $SiO_2$ such as $CaO \cdot SiO_2 \cdot TiO_2$ do not form in the slag, but the excess soda combines with the $Al_2O_3$ and $SiO_2$ to form sodium aluminate and sodium silicate which render the slag suitable for leaching.

The molten slag is taken as a product for treatment and subjected to granulation and wet grinding to condition it for the leaching operation. The granulation eliminates the need for coarse crushing and a simple grinding circuit will provide the necessary conditioning of the slag for the leaching treatment.

The leaching treatment of the finely-divided slag preferably is performed in a two-stage operation to increase the $TiO_2$ content of the solids. The acid leach reactions give the acid leached pulps a peculiar settling property. The reactions are not known in detail, but evidently lead to the formation of some $Ti(OH)_4$ and one or more acid titanates of magnesia, lime and soda.

These may be represented by the general formula $xNa_2O \cdot yTiO_2$ or $xCaO \cdot yTiO_2$. Probably magnesia forms similar compounds. As dilute acid is used in the treatment, it is believed that the following reactions occur:

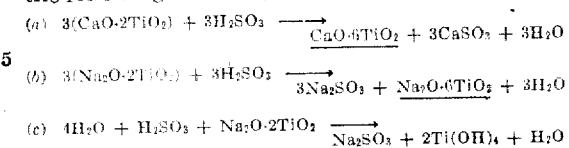

The underlined products form as slimes or in substantially a suspensoid state. The processes of decomposition appear to involve the production of increasingly acid titanates; i. e. the ratio of base/acid decreases as the leaching proceeds until, for a given strength of acid, the reactions stop. All of the titanates are not decomposed in this way but experiments have established that about 80% of the titania is converted into a slime product. In any event the results indicate the probable compounds $Na_2O \cdot 6TiO_2$ or even $$2Na_2O \cdot 15TiO_2$$

(and corresponding lime and magnesium salts) as end products of the acid leaching treatment.

As a consequence, this slimes content is easily separated from other portions of the leach pulp in "separation thickeners," known commercially as hydroseparators. In a quiescent settling zone, the pulp from such an acid leach settles in three distinct layers. First, a dark gray, sandy solid settles very rapidly and completely. Next, a light gray or greenish gray and more bulky layer settles to its maximum density at a slower rate. Finally, a white or grayish-white suspension of slimes forms above the intermediate layer.

The flow sheet illustrated in Figure 2 represents preferred treatment procedure for slag of the type produced by the smelting operation shown in Figure 1. In such a circuit the molten slag is granulated as previously described by mixing with solution from a stock tank and the granulated product is fed to a duplex classifier operating in closed circuit with a ball mill. The overflow of the classifier, preferably a —65 mesh product, is diluted and agitated for as much as two hours and then the agitated pulp is introduced into a separation thickener.

The overflow product of this separation, which is substantially a solution of sodium aluminate, is then conducted to carbonating turbo-mixers or towers to induce precipitation of the alumina content. The product of this treatment is introduced into another separation thickener treatment with the underflow of this operation filtered and then calcined to produce $Al_2O_3$ as a final product.

The overflow product of the separation thickener treatment following carbonation is passed with the filtrate of the subsequent operation to evaporators, and the evaporation leaves as a residual product $Na_2CO_3 \cdot 10H_2O$. This product is calcined to form $Na_2CO_3$ as a final product, which may be returned to the smelting stage as fluxing agent. Usually, approximately 50% of the amount of soda ash introduced into the smelting treatment is thus regenerated and recovered. The underflow product of the initial separation thickener treatment is subjected to countercurrent decantation, with the solution of this operation recirculated by return through the stock tank. The underflow of this decantation is subjected to a filtering treatment with the filtrate also returned to the stock tank.

The filter cake of this separation is passed into a leaching tank and subjected to the action of dilute acid accompanied by agitation. After a suitable period of retention in the agitator, three hours for example, this product is conducted to a separation thickener.

The residue product taken for this treatment contains all the lime and magnesia and most of the silica, sulfur, phosphorus and titania originally present in the slag. The compounds of lime, magnesia and soda with $TiO_2$ (titanates) are all stable with respect to the action of water, but can be decomposed to a major extent by dilute acid. Sulfurous acid is preferred because it is cheapest and, in many respects, the most effective.

Other dilute, commercial acids may be used at this stage. Sulphuric acid, hydrochloric acid and the like are cited as examples. In the flow sheet operation it will be noted that excess air is introduced with the $SO_2$. This air promotes the action, probably by oxidizing the titania compositions with accompanying hydrolysis.

Some titanium is dissolved by the dilute acid, but the amount thus dissolved can be minimized by use of very dilute solutions, since the titanium sulfites and sulfates present tend to hydrolize more readily. However, for economy in operation dilutions in excess of 6:1 are not recommended. This is true, regardless of what acid is used in the treatment.

The slimes separated in the aforesaid separation thickener are difficult to filter, due to their finely-divided suspensoid state, and for that reason are boiled and then passed into another separation thickener. The boiling action promotes the hydrolysis of the dissolved salts to precipitate $Ti(OH)_4$, and granulates the slimes thus facilitating filtration.

The boiled product introduced into this separation thickener is washed and the overflow is discharged from the treatment as a waste product or may be used as a wash solution for the filter cake produced from the acid leach residue. The separated solids are passed to a pressure filter and the collected cake is discharged from the treatment as a $TiO_2$ concentrate and is a suitable product for a pigment plant. In this way 80% or better of the $TiO_2$ content of the original slag is recovered as a product of 90% or higher grade.

The collected underflow solids of the separation thickener following the acid leach agitation are subjected to countercurrent decantation followed by filtering and the solution so separated in the treatment is recirculated as the diluent of the acid leaching stage.

The underflow of the countercurrent decantation is filtered after which the cake is washed and discharged from the treatment as a final tailings product. The filtrate of this operation is returned with the solution of countercurrent decantation to serve as diluent in the agitation stage of the acid leach operation.

When the smelting operation is controlled to throw the vanadium content of the ore into the smelter slag, the vanadium will pass through the first leaching stage as an underflow product and thus come into the second or acid leaching stage. In the separation thickener following acid leaching, 80% or more of the vanadium on charge is found in the solution overflow as dissolved sulfite or sulfate.

When this solution contains a sufficient quantity of vanadium to make its recovery economically feasible, all or a portion of the solution may be treated by well known methods for the recovery of the vanadium content. Under these conditions, the solution so treated would not be used as wash solution for the filter cake in the action previously described.

In certain of the titaniferous magnetites some chromium and manganese are found in the ore. The presence of chromium in the ore treated according to the present process is not a detriment to the recovery or grade of the titania product, as is the case in treating ilmenites by the present sulfuric acid process for titania. In the flow sheet operation, the $Cr_2O_3$ enters the slag as chromate; part dissolves in the water leach and part in the acid leach; but the latter does not interfere with the titania recovery as shown. Manganese behaves similarly.

Consequently, in the simple, economical leaching treatments shown and described, the purpose of the present invention is fulfilled by attaining a recovery of the iron as a useful metallic product and of a high grade titania concentrate, a substantial portion of the soda content of the slag, and recovery of $V_2O_5$ and alumina as by-products. Likewise, when the operation is designed to throw vanadium into the slag of the smelting operation, its recovery in the leaching operation may be effected economically without impedance to the recovery of the aforementioned products.

In the aforesaid smelting operation, limestone has been used with the soda ash as a fluxing agent. In my aforesaid application I have disclosed a smelting treatment in which soda is employed as the sole fluxing agent. This was considered necessary in order to form a water-soluble slag which would permit recovery of the several ingredients of the slag by leaching methods.

However, subsequent investigation has disclosed that the quantity of soda taken for fluxing may be reduced by substituting limestone for a portion of said soda content. This is particularly true when acid leaching of the type disclosed herein is to be employed. The condition to be avoided is the formation of multiple titanates as, for example, a compound of silica, lime and titanium, or a combination of magnesium, silica and titanium.

If soda is present in such a slag in sufficient quantity it prevents the formation of compounds of Ti and SiO₂. The excess soda serves to form sodium aluminate and also sodium silicate under these conditions and thus produces a slag that is suitable for the leaching treatment described hereinbefore.

Consequently, in this operation the alumina content of the ore is employed as an acid rather than a base, which simplifies the recovery of the respective constituents as shown in the flow sheet. Furthermore, it should be understood that while soda ash is a preferred material for fluxing because of its cheapness and availability, any comparable salt or compound of soda may be used in place of the soda ash so long as Na₂O is produced as an eventual product of the operation. Likewise, other fixed alkalis may be used as a substitute material and salts of potassium are cited as an example of the compositions which may be so used.

It has been found that substitution of limestone for soda ash may be used in quantities up to 50% of the weight of the material taken as the fluxing agent without impairing the efficiency of the operation. However, in so doing, the smelting temperatures must be closely controlled as a temperature approximating 1400° C. is necessary to attain the desired separation of the iron if it is desired to throw the vanadium into the metal phase, temperatures of about 1450° C. must be attained. However, if it is desired to throw the vanadium content into the slag, the temperature should be held to a limit of about 1400° in which event the iron will separate cleanly from the other constituents of the ore which form the slag of the treatment.

As previously explained, if the ore contains a sufficient quantity of vanadium to justify its recovery it is preferable to employ temperatures around 1450° C. and throw this vanadium into the metal phase. When tapped, the metal contains very few impurities other than the vanadium, for which reason it is readily separated in the subsequent converter stage as a slag, which on cooling is a high grade vanadium product.

With this understanding of the requisite conditions for practical operation, certain typical treatments will be described to afford a better understanding of the invention.

In one such treatment a sample of Wyoming Iron Mountain ore was crushed to pass a 10 mesh screen. Analysis showed this sample to contain:

| | Per cent | | Per cent |
|---|---|---|---|
| Fe | 49.5 | Al₂O₃ | 4.9 |
| TiO₂ | 21.1 | SiO₂ | 1.1 |
| MgO | 1.9 | V₂O₅ | 0.6 |

2 kilograms of this crushed ore were then mixed with 500 grams of petroleum coke (also crushed through 10 mesh), and 440 grams each of similarly crushed limerock and soda ash. This mixture was placed in a covered graphite crucible and heated in a coke-fired pot furnace. The temperature of the charge was brought to 1450° C. in two hours time and was held at this temperature for one-half hour; the temperature was then raised to 1500° C. in one-half hour, by which time the charge was completely fluid and quiet. The charge was poured into a cast iron chill at three hours total smelting time and allowed to cool. The slag was then broken from the iron button and each product was weighed and sampled for analysis.

The slag weighed 1139 grams and was found to contain:

| | Per cent | | Per cent |
|---|---|---|---|
| TiO₂ | 37.1 | V₂O₅ | 0.3 |
| MgO | 3.3 | FeO | 4.6 |
| Al₂O₃ | 8.6 | CaO | 21.6 |
| SiO₂ | 1.9 | Na₂O | 22.6 |

The iron button weighed 995 grams and was found to contain:

| | Per cent | | Per cent |
|---|---|---|---|
| C | 4.23 | P | 0.018 |
| Si | 0.02 | Ti | trace |
| S | 0.01 | V | 0.52 |

A one kilogram sample of the crushed slag was ground in a laboratory ball mill with 400 grams water for one hour. The pulp was then washed out of the mill and transferred to a mechanical agitator where the volume was made up to 4 liters. Agitation was continued for two hours, when the pulp was filtered and the cake washed with four batches of water of 200 grams each.

The wet cake was then returned to the agitator, 4 liters of fresh water were added and SO₂ was introduced at the rate of 200 grams per hour. At the end of three hours the pH had dropped to a constant value of 3.2 and the sp. gr. of the solution had risen to a constant value of 1.067.

The pulp was allowed to settle for ten minutes, at which time the grayish-white, slime layer, constituting about 95% of the total volume, was decanted. The slime pulp was then boiled for half an hour and allowed to settle. The supernatant liquid was clear and yellow in color. The settled pulp filtered readily and, after washing, was dried and calcined at 600° C. This material weighed 397 grams and was found to contain 88.3% TiO₂.

The sands from the acid-leached pulp were then filtered, washed, dried and calcined, as above. This calcine weighed 97 grams and was found to contain 20.6% TiO₂. Thus the slimes contained 94.7% of the titania in the original slag.

With this understanding of the flow sheet operation and typical test procedure, it will be appreciated that the process is most efficient both in the quality of the final products produced and in the cost of processing. In this connection, it will be noted that the CO₂ gas required in the carbonation stage is produced at another stage of the operation and the steam for the evaporation treatment is likewise produced at another stage. Sufficient solution is produced at various stages of the operation to provide substantially all the diluent required at other stages. Finally, approximately half the soda ash employed as fluxing agent is regenerated and recovered for re-use so that the over-all consumption of fluxing agent presents only a nominal cost factor in the operation.

While the process has been described with particular reference to the treatment of titaniferous magnetites, it has already been suggested that other materials are amenable to the process. As illustrations of these, various ilmenite ores, the products of concentration or physical separation of titaniferous magnetites, or products of partial reduction of naturally-occurring ores or their products may be cited. Thus, the term "ore-like material," as used herein, refers to ore products, as well as ore.

In the smelting operation, carboniferous matter such as coke, usually is employed. However, it should be understood that the coke functions as a reducing substance and hence that term will be used in the specification to designate natural and manufactured gas, and synthetic cokes, as well as commercial coke.

In the acid leaching operation, particularly good results have been obtained where an excess of air has been supplied with the $SO_2$. This air functions as an oxidizing agent and while its use based on present cost figures is desirable, other oxidizing agents such as ferric salts, manganese dioxide and ammonium persulphate may be employed.

From the foregoing, it is apparent that the present process is susceptible of considerable variation in the choice of materials utilized therein, and changes and modifications may be availed of within the spirit and scope of the invention as defined in the hereunto appended claims.

What I claim and desire to secure by Letters Patent is:

1. The process of treating titaniferous ore-like material containing alumina and silica, which comprises mixing such material with carboniferous matter and a mixture of limestone and a fixed alkali composition, the alkali content of such mixture being substantially 50%, heating the resulting mixture to a temperature in excess of 1350° C. until the entire mass is molten, then separating the iron content from the slag of said molten mass, and separating the titanates from aluminates and silicates of said slag by water leaching.

2. The process of treating titaniferous ore-like material containing alumina, silica and vanadium, which comprises mixing such material with carboniferous matter and a mixture of limestone and a fixed alkali composition, the alkali content of such mixture being substantially 50%, heating the resulting mixture to a temperature in excess of 1450° C. until the entire mass is molten, then separating the iron content from the slag of said molten mass, separating the vanadium from the iron by oxidation, and treating the slag to separate the titanates from the aluminates and silicates by water leaching.

3. The process of treating titaniferous magnetites which comprises mixing titaniferous magnetite with a reducing substance, lime and a fixed alkali, said lime being in sufficient quantity to insure the conversion of substantially all the titania into water stable titanates, heating the resulting mixture to a degree sufficient to render the entire mass molten, separating the iron content from the slag of said molten mass, granulating the slag following said separation, subjecting the granulated product to a water leaching treatment followed by decantation, carbonating the solution separated by decantation, separating the precipitate from solution, calcining the separated precipitate to form $Al_2O_3$, evaporating the solution separated from the precipitate, calcining the product of evaporation to recover $NaCO_3$, subjecting the residue of the decantation operation to dilute acid leaching to form titanate slimes, separating slimes and solution from the residual solids of acid leaching, boiling the slimes product to granulate its content, recovering the granulated product as $TiO_2$ concentrate, subjecting the residual product of acid leaching to countercurrent decantation, and returning the enriched solution of countercurrent decantation as the diluent of the acid leaching operation.

4. The process of treating titaniferous magnetites which comprises mixing titaniferous magnetite with a reducing substance, lime and a fixed alkali, said lime being in sufficient quantity to insure the conversion of substantially all the titania into water stable titanates, heating the resulting mixture to a degree sufficient to render the entire mass molten, separating the iron content from the slag of said molten mass, granulating the slag following said separation, subjecting the granulated product to water leaching followed by acid leaching, treating the water leach solution for the recovery of the alumina and alkali content of the slag as separable products, removing residual solids from the acid leaching operation, and treating the solution and associated slimes of the acid leaching operation to produce a $TiO_2$ concentrate.

5. In a process of treating titaniferous ore-like material by smelting, the improvement which comprises heating such an ore material containing some vanadium, while mixed with a fluxing agent, comprising a fixed alkali and limestone in sufficient quantity to insure the conversion of titanium compounds into water stable titanates, to a temperature of at least 1450° C. to cause the iron and a major portion of the vanadium content to separate from the other ore constituents which collect in the resulting slag, and separating the titanium content of the slag from other ore constituents in the slag.

6. In a process of treating titaniferous ore-like material by smelting, the improvement which comprises heating such an ore material containing some vanadium, while mixed with a fluxing agent, comprising a fixed alkali and limestone in sufficient quantity to insure the conversion of titanium compounds into water stable titanates, to a temperature of at least 1450° C. to cause the iron and a major portion of the vanadium content to separate from the other ore constituents which collect in the resulting slag, subjecting the metallic content so separated to the oxidizing action of a Bessemer converter to cause the vanadium content to collect in the converter slag as $V_2O_5$, and separating of the titanium content of the slag from the other ore constituents in the slag.

7. In a process of treating titaniferous ore-like material by smelting as defined in claim 5, the improvement which comprises crushing said ores, mixing the resulting fines of crushing with a smaller quantity of fixed alkali, sintering said mixture, and mixing the sinter with the ore charge of the smelting operation.

8. In a process of treating titaniferous ore-like material by smelting as defined in claim 14, the improvement which comprises crushing said ores until approximately 50% will pass a 10 mesh screen, mixing all the —10 mesh sizes of the resulting product with soda ash in the approximate proportion of 9 parts ore to 1 part soda ash by weight, sintering said intermixture by heating to 1000° C., and then mixing said sinter with the coarser crushed ore as the charge of the smelting operation.

9. The process of treating titaniferous magnetites, which comprises mixing titaniferous magnetite with a reducing substance, lime and a fixed alkali, said lime being in sufficient quantity to insure the conversion of substantially all the titania content into water stable titanates, heating the resulting mixture to a degree sufficient to combine a major portion of the vanadium content with the iron and slag off the other ore constituents, removing said iron and separating the vanadium therefrom, granulating the resulting slag of the initial treatment, subjecting the granulated product to a water leaching treatment followed by decantation, carbonating the solution separated by decantation, separating the precipitate from solution, calcining the separated precipitate to form $Al_2O_3$, evaporating the solution separated from the precipitate, calcining the production of evaporation to recover $Na_2CO_3$, subjecting the residue of the decantation operation to dilute acid leaching to form titanate slimes, separating slimes and solution from the residual solids of acid leaching, boiling the slimes product to granulate its content and recovering the granulated product as $TiO_2$ concentrate.

10. In the treatment of titaniferous magnetites containing magnesia and alumina by smelting, the steps of introducing lime and a fixed alkali as fluxing agents into the smelting operation and in sufficient quantities and proportions to form a slag containing water soluble aluminates, and titanates of lime and magnesia that are stable in water, subjecting such slag to a water leaching operation to dissolve said aluminates without changing the composition of the titanates, treating the resulting solution for the recovery of the alumina content, subjecting the residue of water leaching to a second leaching operation with a dilute acid to decompose the titanates and form $Ti(OH)_4$ and acid titanates as slimes, separating the slimes so formed from the residual solids, granulating said slimes by boiling, and recovering the granules from associated solution as $TiO_2$ concentrate.

11. In a process of treating by smelting ore-like material containing iron, titania, alumina, and silica, the improvement which comprises utilizing in the smelting operation a fixed alkali fluxing agent sufficient in quantity to combine with all the alumina and silica of said material and adapted to convert said alumina and silica into water soluble aluminates and silicates of said fixed alkali; and utilizing as an additional fluxing agent in the smelting operation a sufficient quantity of lime to insure the conversion of the titania of said material into water stable titanates, so as to produce a slag which may be treated to separate the water soluble aluminates and silicates from the water stable titanates by steps which include water leaching.

12. In a process of treating by smelting ore-like material containing iron, titania, alumina and silica, the improvement which comprises utilizing a sufficient quantity of a sodium compound as a fluxing agent to combine with all the alumina and silica of said material, such sodium compound being capable of converting the alumina and silica content of said material into water soluble sodium aluminates and silicates; and utilizing as an additional fluxing agent a sufficient quantity of lime to insure the conversion of the titania content of said material into water stable titanates.

13. In a process of treating by smelting titaniferous ore-like material containing alumina and silica, the improvement which comprises utilizing as a fluxing agent in the smelting operation a sufficient quantity of sodium carbonate to combine with all the alumina and silica of said material and convert said alumina and silica into water soluble aluminates and silicates; and utilizing as an additional fluxing agent a sufficient quantity of lime to insure the conversion of the titania content of such material into water stable titanates.

14. In a process of treating by smelting titaniferous ore-like material containing alumina and silica, the improvement which comprises utilizing as a fluxing agent in the smelting operation a sufficient quantity of soda ash to combine with all the alumina and silica of said material and convert said alumina and silica into water soluble aluminates and silicates; and utilizing as an additional fluxing agent a sufficient quantity of limestone to convert said titania into water stable titanates.

15. The process of treating titaniferous ore-like material containing alumina, silica and vanadium, which comprises mixing such material with carboniferous matter and a mixture of limestone and a fixed alkali composition, the alkali content of such mixture being substantially 50%; heating the resulting mixture to a temperature in excess of 1350° C., but less than 1450° C., until the entire mass is molten; then separating the iron content from the slag of said molten mass; treating the slag to separate the titanates from the aluminates and silicates by water leaching; treating the product of said water leaching which contains titanates, by acid leaching and by separation thickening; and treating the product of such separation thickening which contains titanates, by heating and additional separation to separate the titanium and vanadium compounds thereof.

16. A process of treating a slag containing water soluble aluminates and water stable titanates of lime and magnesia, produced by the treatment of titaniferous ore-like material containing alumina and magnesia by a smelting operation in which soda and lime are used as fluxing agents in quantities and proportions sufficient to convert alumina into water soluble aluminates and also to convert titanium compounds into water stable titanates, comprising the steps of subjecting such slag to a water leaching operation to dissolve said aluminates without changing the composition of the titanates; subjecting the residue to a second leaching operation with a dilute acid to decompose the titanates and form $Ti(OH)_4$ and acid titanates as slimes; separating the slimes so formed from the residual solids; granulating said slimes by boiling the slimes; and separating the granules from associated solution.

17. A process of treating a slag containing water soluble aluminates and titanates of lime and magnesia that are stable in water, produced by the treatment of titaniferous ore-like material containing alumina and magnesia by a smelting operation in which soda and lime are utilized as fluxing agents in quantities and proportions sufficient to convert alumina into water soluble aluminates and also to convert titanium compounds into water stable titanates, comprising the steps of subjecting such slag to a water leaching operation to dissolve said aluminates without changing the composition of the titanates; subjecting th  residue to a second leaching operation with   dilute acid to decompose the titanates and form $Ti(OH)_4$ and acid titanates as slimes; separatin the slimes so formed from the residual solids granulating said slimes by boiling said slimes and subjecting the boiled product to a hindere settling operation for the recovery of the gran ules separate from the clarified solution.

18. A process of treating a slag containin water soluble aluminates and water stable titar ates of lime and magnesia, produced by th treatment of titaniferous ore-like material co taining alumina and magnesia by a smelting o eration in which lime and a fixed alkali composition are used as fluxing agents in quantities and proportions sufficient to convert alumina into water soluble aluminates and also to convert titanium compounds into water stable titanates, comprising the steps of subjecting such slag to a water leaching operation to dissolve said aluminates without changing the composition of said titanates; subjecting the residue to a second leaching operation with sulfurous acid to decompose said titanates and form Ti(OH)$_4$ and acid titanates as slimes; separating the slimes so formed from the residual solids; granulating said slimes by boiling said slimes; and separating the granules from associated solution.

19. In a process of treating a basic slag containing substantially the entire titania, silica, magnesia, alumina, phosphorus and sulfur content of titaniferous ore-like material containing silica, magnesia, alumina, phosphorus and sulfur, said slag having been produced by introducing as fluxing agents soda and lime into the smelting of said material, said lime being in sufficient quantity to insure the conversion of titanium compounds into water stable titanates, the steps which comprise subjecting the slag to leaching with a dilute acid to convert the titanates of the slag into slimes particles; moving the residue of the leaching operation into a quiescent settling zone to induce heavier solids to settle in said zone while the slimes remain at or near the surface of the zone; and collecting the slimes separately from other slag constituents.

20. In a process of treating a basic slag containing substantially the entire titania, silica, magnesia, alumina, phosphorus and sulfur content of titaniferous ore-like material treated by smelting wherein there has been introduced as fluxing agents into the smelting operation a mixture of limestone and a fixed alkali composition, said limestone being in sufficient quantity to insure the conversion of titanium compounds into water stable titanates, the improvement which comprises imparting a different settling property to the titania content than possessed by other constituents of such a slag by leaching said slag with a dilute acid.

21. In a process of treating a basic slag containing substantially the entire titania, silica, magnesia, alumina, phosphorus and sulfur content of titaniferous ore-like material treated by smelting in which a mixture of limestone and a fixed alkali composition have been introduced as fluxing agents, said limestone being in sufficient quantity to insure the conversion of titanium compounds into water stable titanates, the steps which include forming a suspension of the titania content of the slag by leaching the slag in dilute acid; and separating the titania suspension from other slag constituents by decantation.

22. In a process of treating a basic slag containing substantially the entire silica, magnesia, alumina, phosphorus and sulfur content of titaniferous ore-like material treated by smelting in which a mixture of limestone and a fixed alkali composition have been introduced as fluxing agents into the smelting operation, said limestone being in sufficient quantity to insure the conversion of titanium compounds into water stable titanates, the steps which include forming a suspension of the titania content of the slag by leaching the slag in dilute sulfurous acid; and separating the titania suspension from other slag constituents by decantation.

23. In the treatment of titaniferous ore-like material containing alumina and magnesia, the steps of smelting such ore-like material with fluxing agents, including lime and a fixed alkali in sufficient quantity and proportions to form a slag containing water soluble aluminates and water stable titanates of lime and magnesia; subjecting such slag to a water leaching operation to dissolve said aluminates without changing the composition of said titanates; subjecting the residue to a second leaching operation, in which an oxidizing agent is present, to decompose said titanates and form Ti(OH)$_4$ and acid titanates as slimes; separating the slimes so formed from the residual solids; granulating said slimes by boiling the slimes; and separating the granules from associated solution.

24. The process of treating titaniferous ore-like material containing alumina and silica, which comprises mixing said material with a carboniferous reducing substance, a sodium composition and a calcium composition; proportioning such sodium and calcium compositions so that upon heating the mixture to a temperature in excess of 1350° C., such sodium composition reacts to form water soluble aluminates and silicates, and such calcium composition reacts to form water stable calcium titanates; heating said mixture to a temperature in excess of 1350° C; separating the molten ferrous metal and slag; and treating the slag to separate the water soluble sodium aluminates and silicates from the water stable calcium titanates, such separation including water leaching.

25. The process of treating titaniferous ore-like material containing alumina and silica, as defined in claim 24, in which said slag is granulated prior to water leaching.

26. The process of treating titaniferous ore-like material containing alumina and silica, as defined in claim 41, wherein the titanium product resulting from such water leaching is subjected to an acid leaching to separate calcium and magnesium compounds from titanium compounds.

27. The process of treating titaniferous ore-like material containing alumina and silica, as defined in claim 24, which comprises granulating said slag prior to water leaching, acid leaching the titanium containing product of water leaching, and separating the titanium from the calcium and magnesium compounds by heating and separation thickening.

THOMAS P. CAMPBELL.

REFERENCES CITED

The following references are of record in the file of this patent:

UNITED STATES PATENTS

| Number | Name | Date |
| --- | --- | --- |
| 1,106,406 | Rossi et al. | Aug. 11, 1914 |
| 1,106,407 | Rossi et al. | Aug. 11, 1914 |
| 1,106,408 | Rossi et al. | Aug. 11, 1914 |
| 2,159,977 | Nicholas | May 30, 1939 |
| 486,941 | Rossi | Nov. 29, 1892 |
| 2,238,673 | Asak | Apr. 15, 1941 |
| 2,336,177 | Campbell | Jan. 2, 1945 |
| 1,521,607 | Dixon | Jan. 6, 1925 |

FOREIGN PATENTS

| Number | Country | Date |
| --- | --- | --- |
| 747,930 | French | Apr. 4, 1941 |
| 671,943 | German | Feb. 17, 1933 |

Certificate of Correction

Patent No. 2,417,101.                                                                                      March 11, 1947.

THOMAS P. CAMPBELL

It is hereby certified that error appears in the printed specification of the above numbered patent requiring correction as follows: Column 14, line 41, claim 26, for the claim reference numeral "41" read *24*; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.*